Patented June 2, 1931

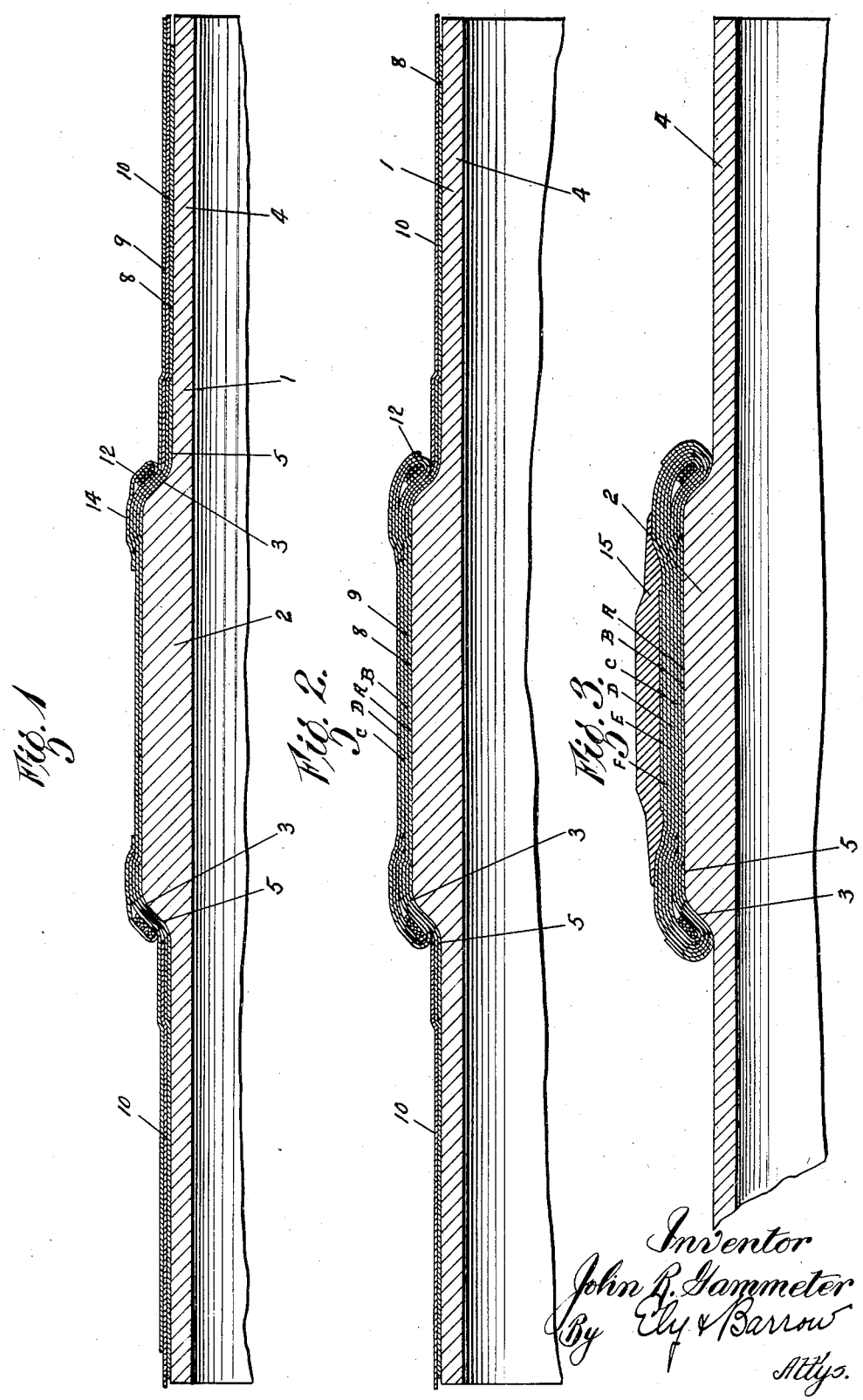

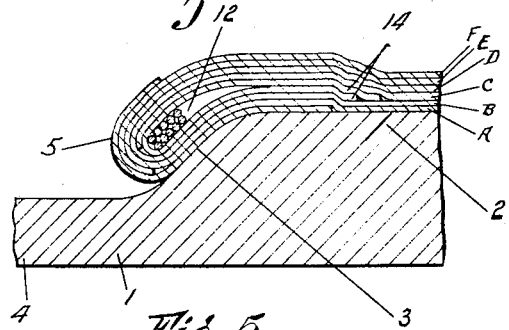
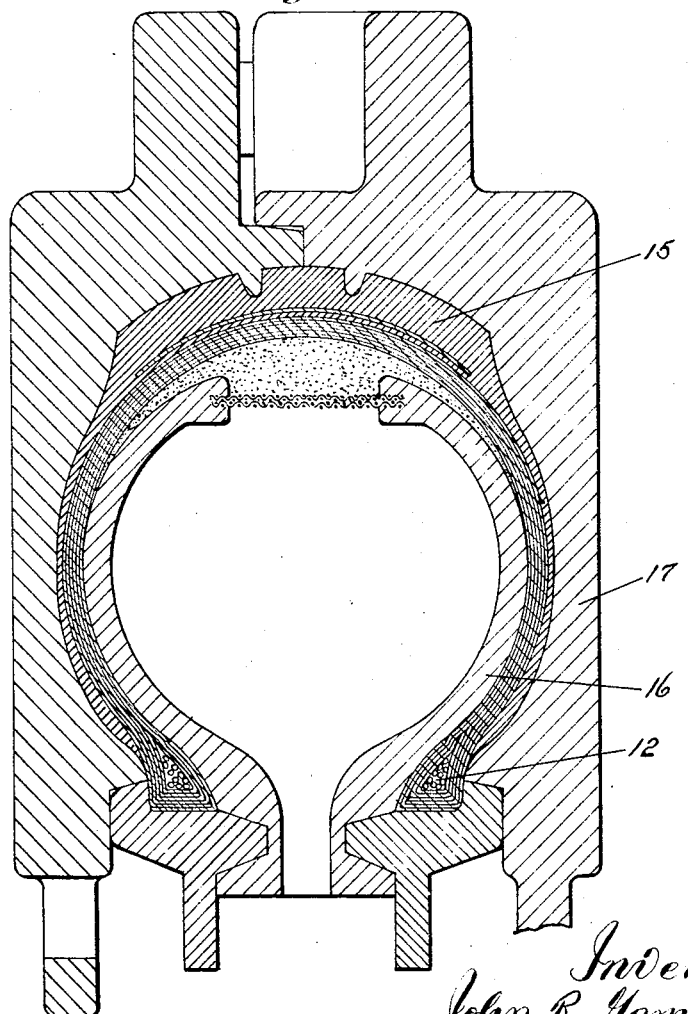

1,807,909

UNITED STATES PATENT OFFICE

JOHN R. GAMMETER, OF AKRON, OHIO

PNEUMATIC TIRE AND METHOD OF MANUFACTURING THE SAME

Application filed April 5, 1928. Serial No. 267,505.

The present invention relates to the manufacture of pneumatic tires, particularly to the process of manufacture known as the "flat band" method, it being an object of the invention to simplify and improve upon existing methods of laying up the several plies which constitute the carcass of the tire. The advantages obtained by the method to be described and illustrated herein are in saving of labor and material in the manufacturing operations, and in the new construction of tire which is obtained as a result thereof.

The present invention relates to the manufacture of a six ply tire in which the plys are anchored at the beads in an effective manner whereby there are no edges of the plies within the flexing portion of the carcass about which a hinging action can take place.

The benefits to be obtained by the use of the invention will be apparent to those skilled in this art, it being understood that exact conformity with the details of the disclosure is not necessary, variations and modifications being permissible within the scope of the invention as set forth in the claims appended hereto.

In the drawings,

Figures 1, 2 and 3 are sections through a building drum showing the manner in which the several plies entering into the carcass are laid up on the drum, together with the other elements which enter into the complete tire construction, these drawings showing the six ply construction;

Figure 4 is an enlarged detail at the bead; and

Figure 5 is a view showing a tire in a mold as it appears during the curing operation, the so-called "clay blow" process of curing being illustrated.

Referring to the drawings, a tire building drum is shown fragmentarily at 1, this drum having a centrally located, enlarged or elevated area 2 bounded by two sloping or beveled surfaces 3 which constitute the bead seats. On either side of the center of the drum are the wings 4 which afford the supports for the lateral extensions of the tire fabric. The first step in the building of the tire is the application of two narrow strips of chafer fabric 5 over the sloping surfaces 3.

The tire carcass is constructed from two strips or layers of cord fabric, rubberized in accordance with the usual practices, said strips or layers being cut at an angle to the cords so that the cords extend across the strips at the desired angles, the cords in one layer crossing the cords in the other layer. The first of these layers is indicated by the numeral 8, and is of a width equal approximately to three times the width of a single ply from bead to bead in the completed tire. This layer is applied in band form or by wrapping it about the drum with the central or middle portion of the ply over the area 2, and the edges or skirts of the plies lying on the wings 4. The second layer 9 is then placed over the layer 8 in the manner described above with the cords crossing the cords of the first layer. It will be noted that the two layers are of substantially the same width, but are offset slightly from one another to provide "step offs" at either edge of the layers.

The central portions of the layers, or that part on the enlarged area 2, are rolled together so that they adhere between the beads. The central portion of these layers, constitute the first and second plies A and B of the finished carcass. The edges or wings of the two layers are separated by the interposition of removable liners.

When the layers of fabric have been assembled as shown in Figure 1, the beads 12 are positioned on the bead seats, the usual flippers 14 being incorporated with the beads and being rolled into place against the layer 9. One edge or wing of the layer 9, here shown as the right hand edge, is folded over the bead 12 on the right of the drum to form the ply C, the edge of this ply terminating at the opposite bead. The left hand edge or wing of this same layer is folded over the left bead to form ply D, the edge of this ply terminating at the right hand bead. The liners 10 are then removed and the edges of the layer 8 are folded over in the same manner from alternate sides to form plies E and F, each ply terminating at the opposite bead. The step-off at the edges of the layers avoids registration of the edges of the plies about the bead. The chafer strips are then folded over the beads. The construction at the left hand bead is shown in enlarged detail in Figure 4.

The tread, cushion, side-walls and breaker indicated at 15 are then laid over the central portion of the flat-built carcass and the tire is expanded by any of the usual methods so as to bring it to the curved or arched shape. It is then placed on a core 16 in a mold 17 for vulcanization. The mold illustrated here is for the so-called "clay blow" process of vulcanization, but it will be appreciated that any well-known or suitable method may be employed, it being the practice to expand the tire by internal pressure during the vulcanizing operation.

The method which has been illustrated secures a six ply tire with the use of only two strips of fabric, each strip affording the material for three layers. By the interposition of the liners which keeps the wings of the two layers from adhering to one another, it is possible to obtain the alternate arrangement of the plies from opposite sides. It is evident that wings on opposite sides of the center of the drum may be folded over at one operation so that the third and fourth plies C and D are formed by layers 8 and 9 from one side of the drum while the fifth and sixth plies E and F are formed by layers 8 and 9 on opposite sides of the drum. This is a somewhat more rapid method of constructing the tire than that shown in the preferred form.

The tire which is the result of the process represents a new construction as the several plies are each formed of two strips of bias cut fabric only and the six plies in any of the forms of the invention are obtained by overlapping the edges af the two plies, and the beads are securely enclosed and enveloped in the bends or folds of the layers. No objectional registration of the edges of the plies is obtained, the stepping off or offsetting of the plies insuring that none of the edges coincide in the completed tire.

It is obvious that the same principles of construction may be followed out in constructing tires of more layers of fabric, and the claims are not necessarily limited to two layers as the foundation of the tire, three or more layers obviously including the two layers as set out in the claims.

What is claimed is:

1. The process of constructing a tire by the flat band method consisting in cutting two layers of fabric of a width greater than twice the width of a ply in the finished carcass, wrapping said layers about a drum to form a two ply band, applying beads at spaced points on opposite sides of the center line of the band, and folding the wings of the layers over the beads from opposite directions whereby six plies of fabric are obtained at the tread portion of the tire each layer of fabric having its edges lying at and secured in the beads of the tire.

2. The process of constructing a tire by the flat band method consisting in cutting a layer of fabric of a width greater than twice the width of a ply in the finished carcass, wrapping the layer about a drum to form a band, applying beads at spaced points on opposite sides of the center line of the band to provide wings extending laterally thereof, and folding the wings of the layer over the beads from opposite directions whereby three superposed plies are obtained from a single layer at the tread portion of the tire, the edges of the layer being located at and secured in the beads of the tire.

3. The process of constructing a tire by the flat band method consisting in cutting two layers of fabric of a width greater than twice the width of a ply in the finished carcass, wrapping said layers about a drum to form a two ply band, the edges of the layers being offset, applying beads at spaced points on opposite sides of the center line of the band, and folding the wings of the layers over the beads from opposite directions whereby six plies of fabric are obtained at the tread portion of the tire, each layer of fabric having its edges lying at and secured in the beads of the tire.

4. The process of constructing a tire by the flat band method consisting in cutting two layers of fabric of a width greater than twice the width of a ply in the finished carcass, wrapping said layers about a drum to form a two ply band, the edges of the layers being offset, applying beads at spaced points on opposite sides of the center line of the band, folding the wings of the layers over the beads from opposite directions whereby six plies of fabric are obtained at the tread portion of the tire, each layer of fabric having its edges lying at and secured in the beads of the tire, and the folding being performed alternately from opposite sides of the tire.

5. The process of constructing a tire by the flat band method consisting in cutting layers of fabric of a width greater than twice the width of a ply in the finished carcass, forming the layers into a multiple ply band with the central portion thereof of a greater diameter than the edges, applying beads to the band at the margins of the central portion, folding the lateral edges of the layers over the beads from opposite sides, and attaching them to the central portion of the band, the edges of the band being located at and secured in the beads of the tire.

6. The process of constructing a tire by the flat band method consisting in cutting two layers of fabric of a width greater than twice the width of a ply in the finished carcass, forming the layers in a multiple ply band, applying beads at spaced distances adjacent the central plane of the tire, and folding the laterally extending edges of the layers over the beads, the folding taking place alternately from opposite sides of the band until a six ply flat band tire carcass is obtained, the edges of the bands being located at and secured in the beads of the tire.

7. The process of constructing a tire by the flat band method consisting in cutting two layers of fabric of a width greater than twice the width of a ply in the finished carcass, forming the layers in a multiple ply band, the edges of the layers being offset, applying beads at spaced distances adjacent the central plane of the tire, and folding the laterally extending edges of the layers over the beads, the folding taking place alternately from opposite sides of the band until a six ply flat band tire carcass is obtained, the edges of the bands being located at and secured in the beads of the tire.

8. A pneumatic tire having at least six plies at the tread portion, three of said plies being formed of parts of a single layer of fabric folded upon itself in opposite directions about the beads of the tire, the edges of each layer being located at and secured in the beads of the tire.

9. A pneumatic tire in which three superposed plies are formed from a single layer of fabric folded about the beads of the tire in opposite directions, the edges of the plies being located at and secured in the tire beads.

JOHN R. GAMMETER.